United States Patent
Zuzuly et al.

Patent Number: 5,956,221
Date of Patent: Sep. 21, 1999

[54] OVERLOAD RELAY HAVING ACCURATE TRIP CURRENT DIAL MARKINGS

[75] Inventors: Daniel Zuzuly, Geneva, Ill.; David W. Laub, Marlboro, N.J.

[73] Assignee: Siemens Energy & Automation, Inc., Alpharetta, Ga.

[21] Appl. No.: 08/938,054

[22] Filed: Sep. 26, 1997

[51] Int. Cl.$^6$ .................................................. H02H 3/00
[52] U.S. Cl. ........................ 361/102; 361/87; 361/115; 335/18
[58] Field of Search .............................. 361/93–94, 97, 361/99, 102, 115, 187, 23, 24, 28–31, 42, 78, 79, 86, 87; 335/18

[56] References Cited

U.S. PATENT DOCUMENTS

| | | | |
|---|---|---|---|
| 4,833,564 | 5/1989 | Pardue et al. | 361/93 |
| 5,517,165 | 5/1996 | Cook | 335/18 |

*Primary Examiner*—Jeffrey A. Gaffin
*Assistant Examiner*—Michael Sherry

[57] ABSTRACT

Problems with inaccuracies in selecting the relay trip current in an overload relay are eliminated in an overload relay employing a custom potentiometer having a resistance that varies at multiple rates to set the trip current value. The dial markings on the trip current adjustment dial are sufficiently spaced to allow for a more precise selection of the relay trip current at the higher ampere settings of the relay.

13 Claims, 4 Drawing Sheets

OVERLOAD RELAY HAVING ACCURATE TRIP CURRENT DIAL MARKINGS

FIELD OF THE INVENTION

This invention relates to overload relays, and more particularly, to an overload relay that allows for precise selection of relay trip current values.

BACKGROUND

Heavy duty electrical machinery used in industrial settings is generally driven by inductive motors. Typically, the motors are rated to operate at particular current ranges.

Overload relays are typically employed to protect such expensive machinery from damage due to overheating resulting from excessive current flow through the motors. An overload relay is merely a sensor that is connected between the power supply and the load and upon the detection of a current overload condition, disconnects the load from the power supply.

An overload relay is usually designed to operate over a wide range of values and the user must set the trip current based upon the specifications of the motor in use. The trip current defines the value at which the relay is triggered into breaking the circuit between the load and the power. The relay's internal current overload detection circuit generally includes a linear taper potentiometer that can be adjusted to set the relay trip current. The current setting is a reciprocal function of the potentiometer resistance so that as the potentiometer resistance is increased, the relay trip current value is decreased and as the potentiometer resistance is decreased, the relay trip current value is increased. As a result, the potentiometer dial markings for the trip current settings get closer and closer together as the value of the current increases. FIG. 1 is an illustration of a known dial markings for setting the trip current. FIG. 2 depicts the relationship between dial rotation in degrees versus the dial setting in amperes. The graph demonstrates how at the higher current settings a smaller degree of rotation of the dial creates a greater change in the current setting as opposed to the lower current range where a smaller degree rotation of the dial creates a smaller change in current setting. This makes it more difficult for the user to accurately select trip current values at the higher end of the scale. Inaccuracies in setting the trip current can result in extensive damage to expensive machinery.

Clearly, it would be desirable to use an overload rely where the dial markings would be sufficiently spaced to enable a more accurate selection of the relay trip current at higher ampere values. The protection afforded by a more precise overload relay would enable to the user to operate heavy equipment closer to its optimal performance levels without risk of expensive damage. The present invention seeks to achieve these objectives.

SUMMARY OF THE INVENTION

It is the principal object of the invention to provide a new and improved overload relay with accurate dial markings on the trip current selection dial. More specifically, it is an object of the invention to provide an overload relay with dial markings that are sufficiently spaced to permit a more precise selection of the relay trip current at higher ampere values and that enable the user to operate heavy equipment closer to its optimal performance levels without risk of expensive damage.

An exemplary embodiment of the invention achieves the foregoing object in an overload relay. The overload relay includes electrical contacts for connecting and disconnecting the load to the power supply. An armature opens the contacts in one position and closes them in a second position. The armature is biased to the second position. A coil, when energized, moves the armature from the first position to the second position. An L-shaped fulcrum pivotally supports the armature with one leg while the other leg rests on the first pole of a multiple pole magnet. An L-shaped yoke has one leg positioned under the second pole of the magnet and the other leg extends through the coil and abuts the first end of the armature. A follower also extends through the coil and abuts the armature at the first end.

The overload relay also includes several current transformers that are adapted to be placed across the power supply phase inputs. A rectifying and sensing circuit is coupled to the current transformers and generates a DC voltage signal that represents the average current from the power supply. A potentiometer having a resistance that can be varied at a non-linear rate is coupled to the rectifying sensing circuit. This potentiometer is used to define a threshold current to trip the overload relay and to generate a scaled average current that is scaled in relation to the threshold current. An amplifier is coupled to the potentiometer and generates a voltage signal that is representative of the scaled average current. A reference voltage source that defines the voltage required to trip the relay is generated by at least one of the phase inputs. A comparator compares the reference voltage with the voltage signal and generates a relay trip signal when the voltage signal differs from the reference voltage by a predetermined amount. The relay trip signal causes the coil to energize.

The overload relay also includes a time delay circuit to prevent inadvertent tripping of the relay due to current transients, a test operator for moving the armature to the second position regardless of whether the coil is energized and a reset operator for moving the armature from the second position to the first position.

Other objects and advantages will become apparent from the following specification taken in connection with the accompanying drawings.

DETAILED DESCRIPTION OF THE PREFERRED EMBODIMENT

Figure 1:
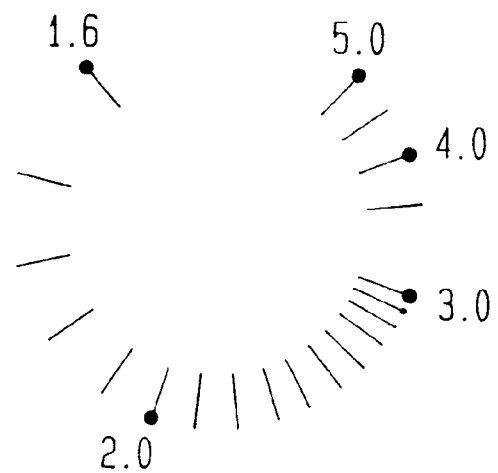
FIG. 1 shows typical dial markings on a prior art overload relay dial for setting the relay trip current.

An exemplary embodiment of the overload relay having an accurate means for setting the trip current according to the invention is illustrated in the drawings and will be described herein. The overload relay has two states: a conductive state that enables the flow of current from a three-phase AC power supply 2 to the load, and a tripped state that disrupts the flow of current from the AC power supply 2 to the load. The overload relay includes a current overload detection circuit 4 (FIG. 3), an overload relay coil 6 (FIG. 4), an actuator assembly 8 and overload relay contacts 10.

Figure 3:
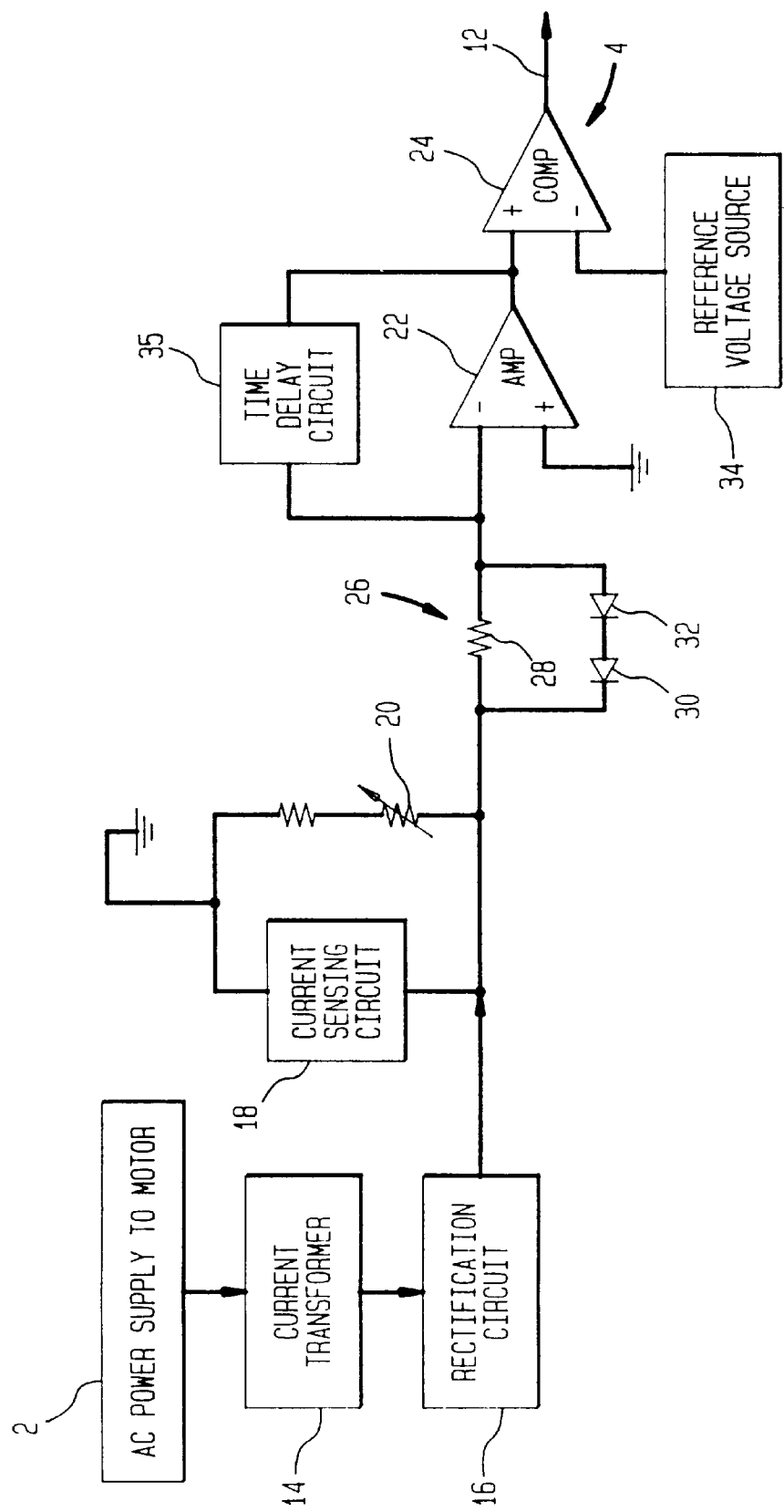
FIG. 3 is a schematic of an overcurrent detection circuit according to the invention.

The current overload detection circuit 4, illustrated in FIG. 3, is designed to monitor the three phase current provided by the power supply 2 and to generate a relay trip signal on a line 12 in response to a power supply current that exceeds an adjustable and predefined relay trip current. The overload relay coil 6 (FIG. 4) energizes in response to the relay trip signal on the line 12 and triggers the actuator assembly 8 which operates to open the overload relay contacts 10 thus disconnecting the power supply 2 (FIG. 3) from the load.

The current overload detection circuit 4 includes a series of current transformers 14, a rectification circuit 16, a sensing circuit 18, a custom potentiometer 20, an amplifier 22 and a comparator 24.

The current transformers 14 are placed in series and adapted to be coupled to the three-phase inputs of the power supply 2. The current transformers 14 are designed to provide an AC current proportional to that flowing from the power supply 2 to the load. The rectification circuit 16 is coupled to the current transformers 14 and converts the AC current generated thereby to a DC current that is proportional to the AC current. The current sensing circuit 18 is conventionally coupled to the rectification circuit 16 and generates a DC voltage signal that is representative of the average current flowing to the load. The custom potentiometer 20 is positioned parallel to the current sensing circuit 18 and scales the average current with reference to the predefined relay trip current.

Figure 5:
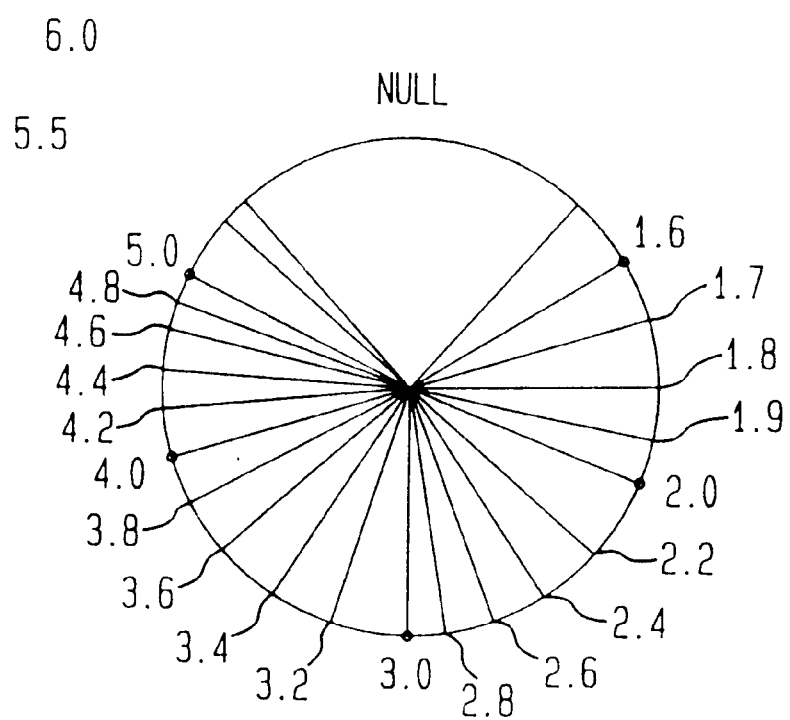
FIG. 5 illustrates the preferred embodiment of an overload relay dial markings for setting the relay trip current.
Figure 2:
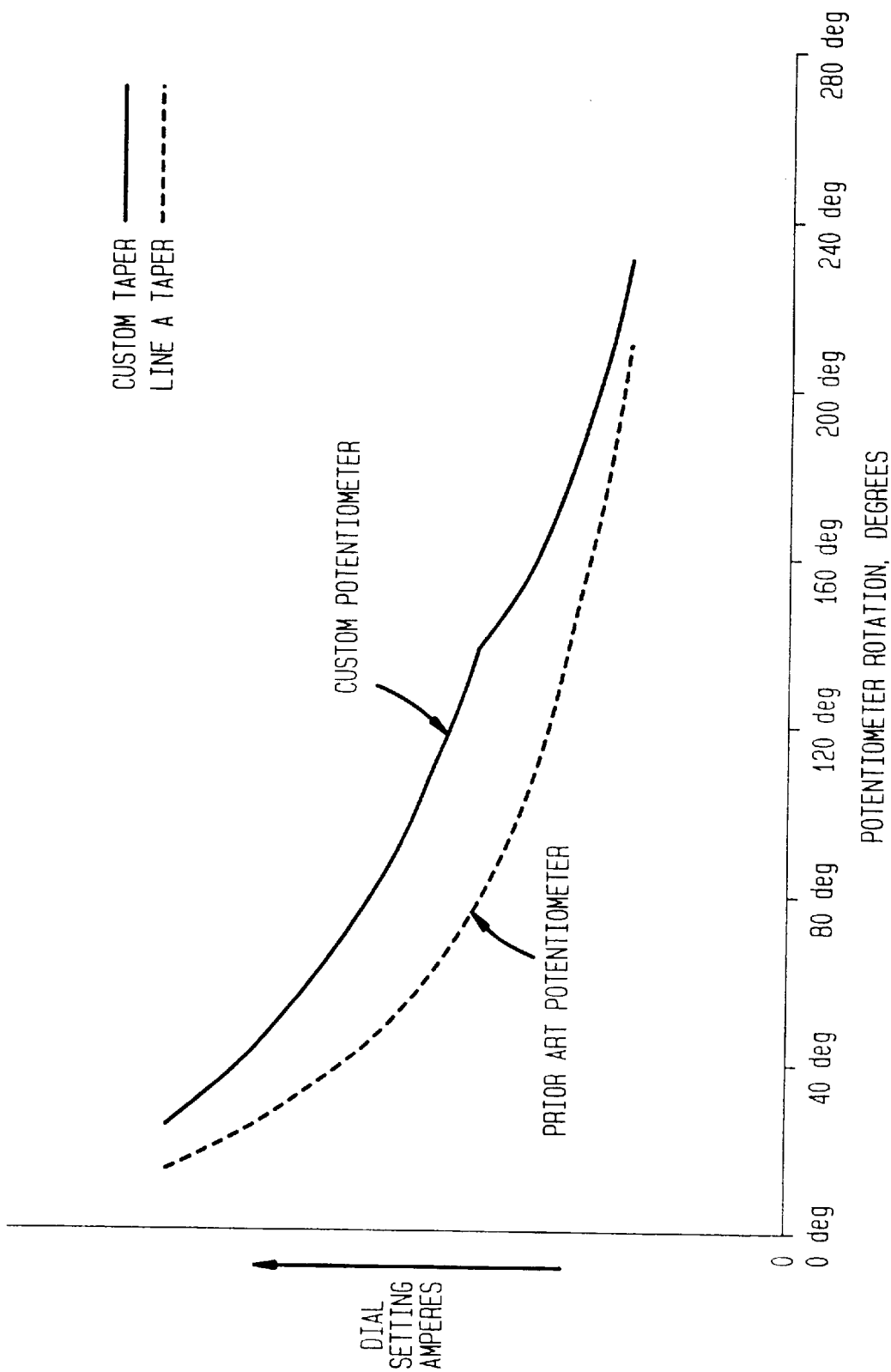
FIG. 2 is a graph depicting the relationship between the dial rotation in degrees versus the dial setting in amperes for the trip current setting dial used in the prior art and the invention.

The custom potentiometer 20 has a dial that can be rotated, for example, from a position of 0 degrees to 280 degrees and enables the user to adjust the relay trip current as a function of the potentiometer resistance. Other rotational amounts could be used for the same purpose. The potentiometer resistance can, for example, vary at one linear rate when the dial is rotated from 0 degrees to 140 degrees and vary at a second linear rate when the dial is rotated from 140 degrees to 280 degrees. FIG. 2 illustrates the relationship between the dial rotation in degrees versus the dial setting in amperes for this example. The custom potentiometer 20 approximates a linear relationship between the rotation of the dial and the increase in the relay trip current setting, thus providing a more accurate means of setting a relay trip current value at higher current settings. This provides a relatively or nominally constant percentage change of the relay trip current values per degree of rotation of the dial. FIG. 5 illustrates the more evenly spaced dial markings on the preferred embodiment of the invention. The custom potentiometer 20 can also be designed to have other rates of change in resistance in relation to the dial setting without departing from the spirit of the invention.

The custom potentiometer 20 is coupled to a conditioning circuit 26 consisting of a resistor 28 and two diodes 30, 32 connected across the resistor 28. The scaled average current generated by the custom potentiometer 20 is conditioned by the conditioning circuit 26. The output of the conditioning circuit 26 is connected to the negative input of an amplifier 22. The amplifier 22 operates to generate a voltage signal that represents the scaled average current of the current flowing from the power supply 2 to the load.

A reference voltage source 34 representing the actual voltage required to trip the overload relay is generated by one of the phase inputs from the power supply 2. The comparator 24 has the output from the amplifier 22 connected to its positive input and the reference voltage source 34 connected to its negative input. The comparator 24 compares the voltage signal representing the power supply current with the voltage signal required to trip the overload relay. If the voltage signal representing the power supply current exceeds the voltage required to trip the overload relay, the comparator generates a relay trip signal on the line 12. A time delay circuit 35 is incorporated into the feedback loop of the amplifier to prevent inadvertent tripping of the relay under transient overcurrent conditions, such as during the start-up phase of the load. The incorporation of the time delay circuit into other sections of the overload relay are considered to be within the scope of this invention.

When the current generated by the power supply 2 exceeds the relay trip current defined by the custom potentiometer 20 dial setting, the current overload detection circuit 4 generates a relay trip signal on the line 12 which operates to energize the overload relay coil 6 which in turn triggers the actuator assembly 8 to open the overload relay contacts 10.

Figure 4:
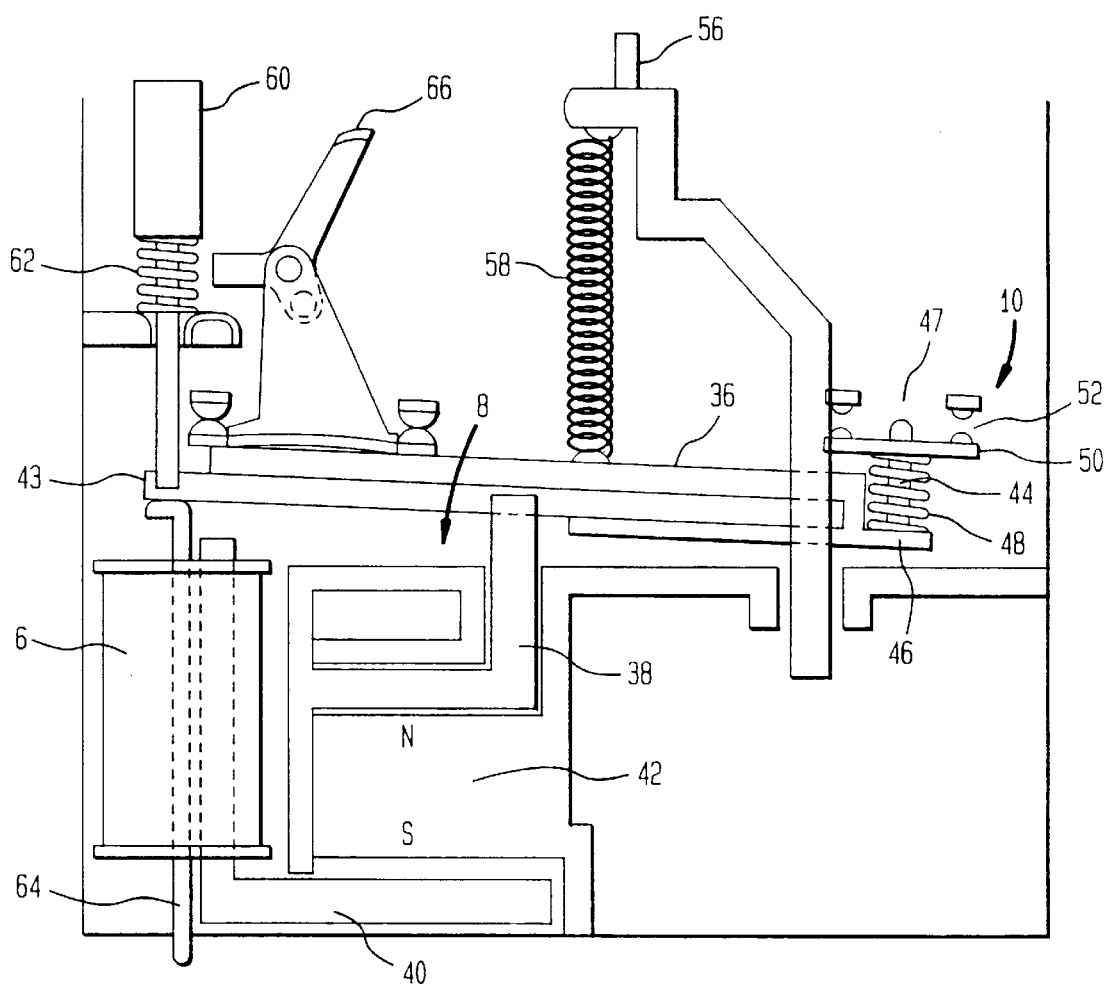
FIG. 4 is a view of the overload relay in a tripped position.

The actuator assembly 8, illustrated in the tripped position in FIG. 4, includes an armature 36, an L-shaped fulcrum 38, an L-shaped magnetic yoke 40, and a permanent magnet 42. The armature 36 is an elongated bar of magnetic material that is pivotally supported by the vertical leg of the fulcrum 38. The horizontal leg of the fulcrum 38 rests on the north pole of the permanent magnet 42. The south pole of the magnet 42 abuts the horizontal leg of the yoke 40. The vertical leg of the yoke 40 extends upwardly through the center of the overload relay coil 6 toward one end 43 of the armature 36.

A post 44 generally extends from the other end 46 of the armature 36 and passes through a first compression spring 48. A plate 50 is slidably supported on the post 44 and urged against a retaining head 47 by the first compression spring 48. One half of the overload relay contacts 52 are positioned on this plate 50. The overload relay contacts 10 are positioned so that when the armature 36 is in an approximately horizontal position, the overload relay contacts 10 are closed connecting the load to the power supply 2.

Under normal operating conditions, the armature 36, the fulcrum 38, the yoke 40 and the magnet 42 form a closed magnetic circuit. The armature 36 is maintained in an untripped, horizontal position by magnetic attraction and the overload relay contacts 10 remain closed.

The first compression spring 48 biases the first end of the armature 46 downward and the end 43 of the armature 36 upward and away from the yoke 40. However, when the overload relay is in a conductive state, the first compression spring 48 does not exert sufficient force to overcome the magnetic attraction between the armature 36 and the yoke 40 and the armature 36 remains in a horizontal position.

Under overcurrent conditions, the current overload detection circuit 4 generates a relay trip signal on a line 12 which in turn causes the overload relay coil 6 to energize. The energized overload relay coil 6 generates a magnetic field in the yoke 40 that is opposite to that of the magnet 42. This newly created magnetic field overcomes the magnetic attraction between the yoke 40 and the armature 36. The first compression spring 48 forces the first end 46 of the armature 36 downward into the tripped position and breaks the connection between the overload relay contacts 10 thus disconnecting the power supply 2 from the load. The magnetic field generated by the magnet 42 is insufficient to pull the armature end 43 back towards the yoke 40 even after the coil 6 is deenergized.

A test button 56 is operably connected to the armature 36 via a second compression spring 58. A second compression spring 58 biases the test button against the relay housing.

Depressing the test button 56 causes the compression spring 58 to exert sufficient force on the armature 36 to overcome the magnetic attraction between the armature 36 and the yoke 40 and forces the armature end 46 downward into the trip position breaking the connection between the overload relay contacts 10.

The reset button 60 allows the user to reset the overload relay once it has been tripped. The reset button 60 is biased against the relay housing using a third compression spring 62. A follower 64, located below the reset button 60, extends through the overload relay coil 6 and abuts the second armature end 43. Under normal operating conditions, the follower 64 is magnetically attracted to both the yoke 40 and the armature 36. When the armature 36 moves to its tripped position, the follower 64 is still magnetically attracted to the armature 36 and follows the second end 43 of the armature 36 upward. When there is no longer any current flowing through the overload relay coil 6, the magnetic attraction between the armature end 43 and the follower 64 is such that when the follower 64 is moved downward, the armature 36 follows its movement. When the reset button 60 is depressed, it pushes the follower 64 downward and the armature 36 follows the follower 64 to abut the yoke 40 resetting the overload relay.

A flag 66 is pivotally attached to the armature 36 and the overload relay housing so that it is visible through an aperture in the housing when the overload relay is in a tripped state.

It will be appreciated that an overload relay with a trip current setting dial design based on the use of a custom potentiometer having a resistance that varies at multiple rates allows for a more precise selection of the relay trip current. The dial markings on the trip current selection dial are sufficiently spaced to allow for a more accurate selection of the relay trip current value at the higher ampere settings. This enables the user to operate heavy industrial machinery closer to optimal performance levels without risk of damage to expensive motors resulting from overheating due to excessive current flow.

We claim:

1. An overload relay for connection between an inductive load and an AC power supply comprising:

electrical contacts operable to connect the power supply to the load when the contacts are in a closed state and to disconnect the power supply from the load when the contacts are in an open state;

an armature for operating said electrical contacts and having a first position where the electrical contacts are in said closed state and a second position where the electrical contacts are in said open state;

a biasing means for biasing the armature to the second position;

a coil operable to move said armature to the second position when the coil is energized;

a source of a reference voltage generated by at least one of the phase inputs defining a relay trip voltage;

a plurality of current transformers placed in series and adapted to be coupled to phase inputs of the power supply;

a rectifying and sensing circuit coupled to the current transformers operable to generate a DC voltage signal representative of the average current generated by the power supply;

a potentiometer coupled to the rectifying and sensing circuit and operable to define a threshold current to trip the overload relay and to generate a scaled average current scaled in relation to the threshold current;

said potentiometer having a resistance that varies at a non-linear rate;

an amplifier having an input coupled to said potentiometer and operable to generate a voltage signal that is representative of the scaled average current;

a comparator receiving the reference voltage and the voltage signal and generating a relay trip signal when the voltage signal differs from the reference voltage by a predetermined amount;

said relay trip signal operable to energize said coil;

an L-shaped fulcrum positioned so that an end of one leg of the fulcrum pivotally supports the armature;

a multiple pole magnet positioned so that a first pole of the magnet abuts against the other leg of the fulcrum;

an L-shaped yoke having one leg of the yoke in abutment a second pole of the magnet and having another yoke leg extending through the coil to abut a first end of the armature when the armature is in the first position; and a follower extending through the coil and abutting the armature at the first end.

2. An overload relay according to claim 1 including a time delay circuit to prevent inadvertent tripping of the overload relay due to current transients.

3. An overload relay according to claim 1 including a test operator operably connected to the armature to move the armature to the second position regardless of whether the coil is energized.

4. An overload relay according to claim 1 including a reset operator for moving the armature from the second position to the first position.

5. An overload relay for connection between an inductive load and an AC power supply comprising:

electrical contacts operable to connect the power supply to the load when the contacts are in a closed state and to disconnect the power supply from the load when the contacts are in an open state;

an armature for operating said electrical contacts and having a first position where the electrical contacts are in said closed state and a second position where the electrical contacts are in said open state;

a biasing means for biasing the armature toward the second position;

a coil operable to move said armature to the second position when the coil is energized;

an L-shaped fulcrum positioned so that an end of one leg of the fulcrum pivotally supports the armature;

a multiple pole magnet positioned so that a first pole of the magnet is in abutment with the other leg of the fulcrum;

an L-shaped yoke having one leg of the yoke in abutment with a second pole of the magnet and having another yoke leg extending through the center of the coil to abut a first end of the armature when the armature is in the first position;

a follower extending through the coil and abutting the armature at the first end;

a current overload detection circuit operable to generate a relay trip signal to energize the coil when the current to the load exceeds a predefined threshold; and said detection circuit including a potentiometer having a resistance that varies at a non-linear rate for setting the threshold current for tripping the relay.

6. An overload relay according to claim 5 including a time delay circuit to prevent inadvertent tripping of the overload relay due to current transients.

7. An overload relay according to claim 5 including a test operator operably connected to the armature to move the armature to the second position regardless of whether the coil is energized.

8. An overload relay according to claim 5 including a reset operator for moving the armature from the second position to the first position.

9. A current overload detection circuit in an overload relay for connection between an inductive load and an AC power supply comprising:

a source of a reference voltage generated by at least one of the phase inputs and defining a relay trip voltage;

a plurality of current transformers placed in series and adapted to be coupled to phase inputs of the power supply;

a rectifying and sensing circuit coupled to the current transformers operable to generate a DC voltage signal representative of the average current generated by the power supply;

a potentiometer coupled to the rectifying and sensing circuit and operable to define a threshold current to trip the overload relay and to generate a scaled average current that is scaled in relation to the threshold current;

said potentiometer having a resistance that varies at a non-linear rate;

an amplifier having an input coupled to said potentiometer and operable to generate a voltage signal that is representative of the scaled average current; and a comparator receiving the reference voltage and the voltage signal and generating a relay trip signal when the voltage signal differs from the reference voltage by a predetermined amount.

10. An overload relay for connection between an inductive load and an AC power supply comprising:

electrical contacts operable to connect the power supply to the load when the contacts are in a closed state and to disconnect the power supply from the load when the contacts are in an open state;

an armature for operating said electrical contacts and having a first position where the electrical contacts are in said closed state and a second position where the electrical contacts are in said open state;

a magnetic keeper operable to releasably maintain the armature in the first position;

an electrical operator for moving the armature to said second position operable to overcome the magnetic keeper when energized;

a biasing means for biasing the armature toward the second position and for holding the armature in the second position when the magnetic keeper has been overcome;

a current overload detection circuit operable to generate a relay trip signal to energize the electrical operator when the current to the load exceeds a predefined threshold; and said detection circuit including a potentiometer having a resistance that varies at a non-linear rate for setting the threshold current for tripping the relay.

11. An overload relay according to claim 10 including a time delay circuit to prevent inadvertent tripping of the overload relay due to current transients.

12. An overload relay according to claim 10 including a test operator operably connected to the armature to move the armature to the second position regardless of whether the coil is energized.

13. An overload relay according to claim 10 including a reset operator for moving the armature from the second position to the first position.

* * * * *